Patented Dec. 22, 1936

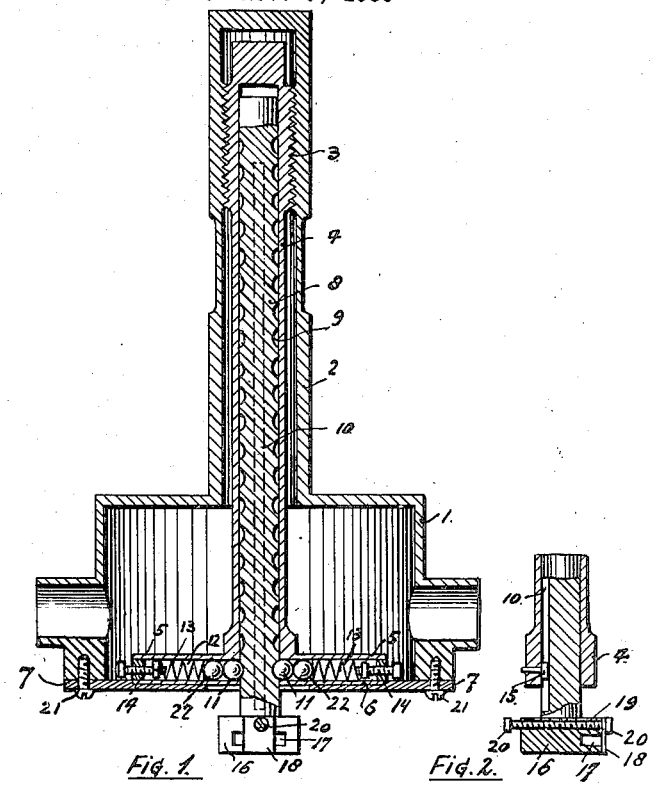

2,065,317

UNITED STATES PATENT OFFICE 2,065,317

SUSPENSION DEVICE FOR ELECTRIC LIGHT FITTINGS

Carl August Rudolph Knötschke, Amsterdam, Netherlands

Application November 5, 1935, Serial No. 48,349
In the Netherlands November 16, 1934

6 Claims. (Cl. 248—327)

Chandeliers, ceiling fittings and like suspension devices for electric light fittings are usually suspended by means of a hook which is screwed into wooden transverse beams or wooden laths of the ceiling. This method of suspension has the disadvantage that, as a rule, several holes have to be bored into the ceiling in order to ascertain the position of the wooden member adapted to take the hook. This preliminary boring spoils the ceiling; moreover hook suspension has the disadvantage that when the chandelier or other electric light fitting is turned during dusting, in the same direction, the hook may become accidentally unscrewed, which of course, may lead to a serious accident. It has been proposed to improve this kind of suspension by providing a wooden rosette upon the cover of an iron junction box provided in the ceiling, and fixing the rosette and the cover of the junction box by means of the same screws. It is, however, a very wearisome operation to fix a cover together with a rosette upon the junction box, as this operation has to be carried out by the operator standing upon a ladder. Moreover, it frequently happens that one of the screws of the cover is lost, so that the whole fitting suspended from the hook of the wooden rosette, hangs upon a single screw of the junction box. The second disadvantage of the first-mentioned suspension method is not avoided by the second-mentioned method of suspension.

There are also known iron junction boxes having a specially constructed iron cover provided with a trapeze-like guide slot into which corresponding members for fixing the fitting are slidably mounted. This arrangement has the disadvantage that a considerable amount of space is lost within the junction box by the provision of the guide slot, and consequently there is danger of the porcelain caps of the welding points being fractured.

A common disadvantage of the known suspension devices is the fact that the rosette of the fitting is suspended from the hook by means of a link and must therefore project several centimetres from the ceiling, which spoils the appearance of the suspension device.

It is the object of the invention to provide a suspension device which is free from all the above-mentioned drawbacks. According to the invention the link of the electric fitting is fixed to a suspension rod which is adapted to be slid up and down within a junction box mounted in the ceiling. The said suspension rod is secured against turning and dropping out. The adjustment of the suspension rod is regulable and is so arranged that the suspension rod cannot drop out. The fitting is suspended from the rod by means of a single screw which greatly facilitates the fixing operation.

The fitting together with the rosette may be suspended quite close to the ceiling and may, if desired, be lowered from the ceiling to a distance of about one decimetre. On suspending the fitting, the ceiling cannot be damaged in any way, as the whole fitting is attached to a stationary junction box.

One constructional form of the improved suspension device embodying the features of the invention is illustrated in the accompanying drawing, in which:

Fig. 1 is a sectional elevation,

Fig. 2 is a detail vertical section through the lower part of the suspension device, at right angles to Fig. 1, Fig. 3 is an interior top view of the iron cover of the iron junction box.

The device comprises an iron junction box 1 which is fixed in the ceiling. This junction box 1 has a cylindrical hollow tail member 2, the upper portion of which is provided with internal screw threads 3. Into the threaded portion of the tail member 2 is screwed a cylindrical hollow rod 4 provided with corresponding external screw threads. The hollow rod 4 is formed at its lower end with a cross member 5 which fits into a recess 6 of the cover 7 of the junction box. Within the hollow rod 4 is vertically slidable a rod 8. In the rod 8 is provided a number of semispherical or like depressions 9 in two vertical rows located diametrically opposite each other. The row 8 is also formed with a longitudinal groove 10 located between the rows of projections. Any pair of corresponding depressions 9 of the rod may be engaged by two balls 11 mounted in bores 12 of the cross members 5. The balls are pressed into the depressions by further balls 22 and springs 13, which latter are screwed more or less deeply into the bores 12 by means of screws 14, whereby the force required for sliding up and down the rod 8 may be regulated in accordance with the weight of the fitting. The rod 4 is provided with a projection 15 which prevents the rod 8 from dropping out of the rod 4. The rod 8 is provided with a suspension member 16 having a cross slot 17 for the reception of the suspension link of the fitting. This cross slot 17 is covered by means of a small plate 18, which latter is fixed in the locking position by means of a screw bolt 19 passing through the suspension member 16 and provided with a head 20.

The operation is as follows:

After the junction box 1 has been secured in position and the leads have been fixed, the rod 4 together with the suspension rod 8 are inserted into the tail 2 of the junction box 1 and are screwed into the tail member so that the cross member 5 somewhat projects from the junction box 1. The cover 7 is then slid over the member 16 of the suspension rod 8, so that the cross member 5 fits into the recess 6, whereupon the cover 7 is forced on and turned until the fixing screws 21 can be screwed in. The rod 4 can now no longer be turned.

For suspending the electric fittings, the suspension rod 8 is pulled out until it strikes the projection 15, whereupon the plate 18 is loosened by means of the bolt 19. The suspension link of the fitting is then placed into the cross slot 17 and the plate 18 is fixed by means of bolt 19. The rod 8 is now lifted until the rosette comes into contact with the ceiling.

Modifications of the described constructions are possible within the scope of the appended claims.

I claim:

1. A suspension device for electric light fittings comprising in combination: a junction box adapted to be fixed in and substantially flush with the ceiling; a suspension rod within said junction box and projecting into the ceiling provided with means for attaching an electric light fitting to the rod; means in said junction box for guiding said suspension rod in the vertical direction; means for fixing the suspension rod in various adjusted vertical positions; auxiliary means for preventing rotation of said suspension rod in the junction box; auxiliary means for preventing the suspension rod from dropping out; and resilient adjustable means for operating said means for fixing the rod in adjusted vertical positions.

2. A suspension device for electric light fittings comprising in combination: a junction box adapted to be fixed in and substantially flush with the ceiling and provided externally on one side thereof with an upstanding tubular internally threaded portion; a bottom cover adapted to be fixed to said junction box on the opposite side thereof; a hollow rod adapted to be screwed into the tubular portion of the junction box; auxiliary means carried by said bottom cover for securing said hollow rod against rotation after the rod has been screwed into the junction box; a suspension rod vertically slidable in said hollow rod, said suspension rod being provided with means for attaching an electric fitting; means for resiliently holding said inner suspension rod in various adjusted vertical positions; means for preventing rotation of said suspension rod in said hollow rod; and auxiliary means for preventing dropping out of the inner suspension rod from the hollow rod.

3. A suspension device for electric light fittings comprising in combination: a junction box adapted to be fixed in and substantially flush with the ceiling and provided with an internally threaded tubular portion extending upwardly on one side thereof; a bottom cover adapted to be fixed to said junction box on the opposite side thereof to said tubular portion and provided with a transverse recess; a hollow tubular rod adapted to be screwed into said tubular portion of the junction box and provided at its lower end with tubular cross members adapted to be engaged by said recess in said bottom cover; an internal suspension rod adapted to slide within said hollow rod and provided with means for attaching an electric fitting; said internal suspension rod being provided with two vertical rows of depressions, and being also provided with a vertical groove; a projection on said hollow rod engaging said groove to prevent rotation of said suspension rod and also dropping of the suspension rod from the hollow rod; and spring operated balls adapted to engage said depressions, to hold the suspension rod in various adjusted vertical positions, said spring operated balls being mounted in the said transverse members provided at the lower end of said hollow rod.

4. A suspension device for electric light fittings comprising in combination: a junction box adapted to be mounted within and substantially flush with the ceiling; a hollow rod in and projecting above said junction box; a suspension rod slidable vertically in said hollow rod and having a power end projecting from said suspension box, said lower end being provided with means for attaching electric light fittings, said means comprising a transverse slot adapted to receive a suspension link and means for closing said transverse slot comprising a plate and a fixing screw; means in said junction box for securing said suspension rod in various adjusted vertical positions in the aforesaid hollow rod; means within said junction box for preventing rotation of said suspension rod; and means in said junction box for preventing falling out of the suspension rod.

5. In a suspension device for electric light fittings the sub-combination of: a junction box adapted to be fixed in the ceiling; a hollow rod in said junction box and projecting upwardly therefrom; a suspension rod slidable in said hollow rod and having means for the attachment of an electric light fitting; and means for fixing the suspension rod in various adjusted vertical positions in said hollow rod.

6. In a suspension device for electric light fittings the sub-combination of: a junction box adapted to be fixed in the ceiling; a hollow rod in said junction box and projecting upwardly therefrom; a suspension rod slidable in said hollow rod and having means for the attachment of an electric light fitting, said suspension rod being provided with two vertical rows of depressions; cross members on the lower end of said hollow rod and spring-operated balls adapted to engage said depressions and hold the suspension rod in various adjusted vertical positions in said hollow rod, said spring-operated balls being mounted in the said cross members.

CARL AUGUST RUDOLPH KNÖTSCHKE.